(12) United States Patent
Benson

(10) Patent No.: US 10,802,559 B2
(45) Date of Patent: Oct. 13, 2020

(54) DATA PORT POWER TRANSFER

(71) Applicant: HEWLETT-PACKARD DEVELOPMENT COMPANY, L.P., Houston, TX (US)

(72) Inventor: Roger D Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 166 days.

(21) Appl. No.: 15/746,116

(22) PCT Filed: Sep. 4, 2015

(86) PCT No.: PCT/US2015/048635
§ 371 (c)(1),
(2) Date: Jan. 19, 2018

(87) PCT Pub. No.: WO2017/039697
PCT Pub. Date: Mar. 9, 2017

(65) Prior Publication Data
US 2018/0210528 A1    Jul. 26, 2018

(51) Int. Cl.
| | |
|---|---|
| *G06F 1/26* | (2006.01) |
| *H04B 10/564* | (2013.01) |
| *H04B 10/296* | (2013.01) |
| *H02J 9/06* | (2006.01) |
| *G06F 1/28* | (2006.01) |
| *G06F 1/30* | (2006.01) |
| *H02J 7/00* | (2006.01) |
| *G06F 11/20* | (2006.01) |

(52) U.S. Cl.
CPC .............. *G06F 1/266* (2013.01); *G06F 1/263* (2013.01); *G06F 1/28* (2013.01); *G06F 1/305* (2013.01); *H02J 9/061* (2013.01); *H04B 10/296* (2013.01); *H04B 10/564* (2013.01); *G06F 1/26* (2013.01); *G06F 1/30* (2013.01); *G06F 11/2015* (2013.01); *H02J 7/00* (2013.01); *H02J 2207/30* (2020.01)

(58) Field of Classification Search
CPC . G06F 1/26; G06F 1/266; G06F 1/263; G06F 1/30; G06F 11/2015; G06F 1/28; G06F 1/305
USPC .................................. 713/300, 310; 714/14
See application file for complete search history.

(56) References Cited

U.S. PATENT DOCUMENTS

| | | |
|---|---|---|
| 5,939,799 A | 8/1999 | Weinstein |
| 6,097,108 A | 8/2000 | Tweed |
| 8,612,060 B2 | 12/2013 | Harriman et al. |
| 8,661,268 B2 | 2/2014 | Brooks et al. |
| 8,918,549 B2 | 12/2014 | Waters |

(Continued)

OTHER PUBLICATIONS

"FT2232L Dual USB UART/FIFO I.C." May 20, 2005.

(Continued)

*Primary Examiner* — Ji H Bae
(74) *Attorney, Agent, or Firm* — HPI Patent Department

(57) ABSTRACT

An example system includes a first data port and a second data port. The system includes a controller electrically coupled to the first and second data ports. The controller is to cause the first data port to receive power. The controller is to cause the second data port to output at least a portion of the received power. The controller is to detect an impending loss of power to the first data port. The controller is to cause the second data port to transmit an urgent power request.

20 Claims, 6 Drawing Sheets

(56) References Cited

U.S. PATENT DOCUMENTS

| | | |
|---|---|---|
| 2009/0216981 A1 | 8/2009 | Diefenbaugh et al. |
| 2010/0013313 A1 | 1/2010 | Groff et al. |
| 2011/0016333 A1 | 1/2011 | Scott et al. |
| 2013/0238819 A1 | 9/2013 | Oljaca et al. |
| 2013/0290765 A1 | 10/2013 | Waters et al. |
| 2014/0304529 A1 | 10/2014 | Meazell |
| 2016/0139642 A1* | 5/2016 | Hijazi ................... G06F 1/26 361/679.31 |

OTHER PUBLICATIONS

"TPS65982 USB Type-C and USB PD Controller, Power Switch and High Speed Multiplexer", Jun. 30, 2015.
Schneider, David: "PD Quick-Swap Proposal," Sep. 4, 2015, USB Power Delivery Email List.

* cited by examiner

DATA PORT POWER TRANSFER

BACKGROUND

A data port may transfer data or power between a plurality of devices. The data port may be a Universal Serial Bus (USB) port, an Institute of Electrical and Electronics Engineers (IEEE) 1394 port, a Telecommunications Industry Association (TIA)-232 port, a Mini DisplayPort, a High-Definition Multimedia Interface (HDMI) port, a Digital Visual Interface (DVI) port, an external peripheral component interconnect express (PCIe) port, or the like. The data port may include a plurality of pins, such as a data pin, a high speed transmit pin, a high speed receive pin, a configuration pin, a ground pin, a power pin, or the like. In some examples, the data port may include pairs of pins for data communication (e.g., a pair of data pins, a pair of high speed transmit pins, a pair of high speed receive pins, etc.). Separate pins may be used for data communication and for power transfer. For example, the power and ground pins of the data port may be used to deliver direct current (DC) power. As used herein, the term "signal pin" refers to a data pin, a high speed transmit pin, a high speed receive pin, or a configuration pin.

DETAILED DESCRIPTION

Figure 1:
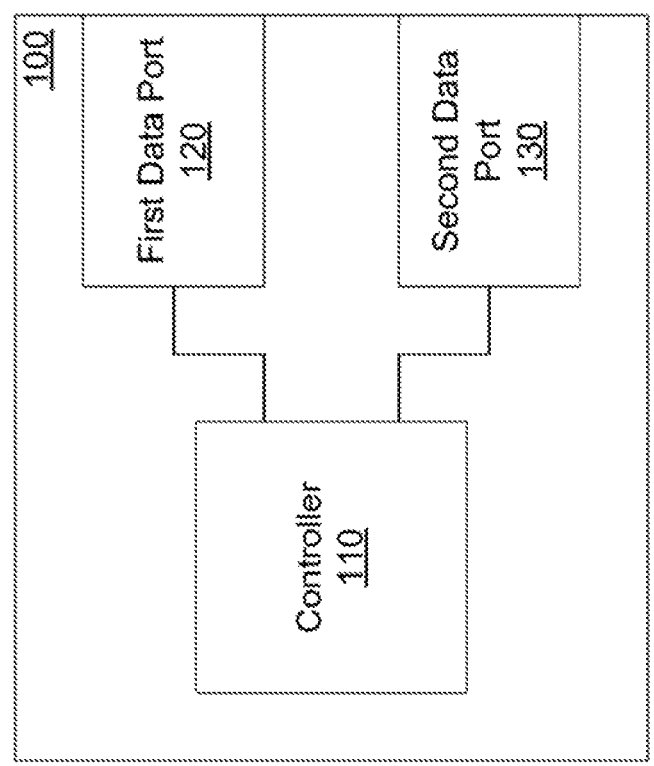
FIG. 1 is a block diagram of an example system to request a rapid reversal of a power transfer.

A first device may transfer power to a second device via the data ports of each device. The devices may be able to negotiate the power to be transferred and perform power role swaps. The negotiation of the power to be transferred may change how much power is transferred between the devices. A power role swap may change the direction that power flows between the devices. In an example, the devices may perform a power swap so the second device is transferring power to the first device. After the power role swap, the transfer power may be small, so the devices may negotiate for more power to be transferred.

To perform a power swap, for example, one of the devices may request the power swap, and the other device may accept the request. If the first device was transferring power to the second device before the power swap request, the second device may transition to a standby state. The first device may transition to a standby state and may send a ready indication when it has done so. The second device may transition to a state where it is able to transfer a power at a default rate to the first device and may send a ready indication when it has done so. The first device may draw power from the first device at the default rate. The default rate may be small. For example, it may be the smallest non-zero rate for transferring power.

The devices may negotiate for more power by determining a power policy to be used to transfer power. As used herein, the term "power policy" refers to the voltage and current used to transfer power. The power policy may also include the power source from which the source device receives power (e.g., a fixed supply with a well-regulated voltage output, a battery, a variable supply, etc.). The power policy may be specified by indications of the voltage, current, power, or the like to be used to transfer power. For example, the power policy may be specified by a voltage, a maximum current, and an operating current to be used to transfer power. Alternatively, or in addition, for a variable supply, the power policy may be specified by a maximum voltage, a minimum voltage, a maximum power, and an operating power to be used to transfer power.

To negotiate the power policy, the second device may indicate the power policies at which it is able to transfer power. The first device may request a power policy at which it would like to receive power. The second device may send a response accepting or rejecting the request. If the request is accepted, the first device may go to a different state, such as a standby state. The second device may transition to a state in which it is able to provide power according to the requested power policy and may send a ready indication when it has done so. The first device may draw power at the requested power policy in response to the ready indication.

In an example, a second device without a battery may be delivering power to a first device with a battery when a power source for the second device is removed. For example, a connection delivering power to the second device may be unplugged. To continue operation, the first and second device may need to perform a power swap and negotiate a power policy sufficient to power the second device or any devices connected to the second device. However, it may take a significant amount of time to perform the power swap and the negotiation. Power may be lost before the power swap and the negotiation are complete. The first device may then need to detect that the second device has lost power and provide power at a default power policy. Afterwards, the devices may negotiate a power policy sufficient to power the second device or any devices connected to the second device. Thus, the second device may experience a loss of power for a prolonged period. Accordingly, there is a need for a way to provide power rapidly from the first device to the second device in response to a loss of power at the second device.

FIG. 1 is a block diagram of an example system 100 to request a rapid reversal of a power transfer. The system 100 may include a controller 110. A first data port 120 and a second data port 130 may be electrically coupled to the controller 110. As used herein, the term "controller" refers to hardware (e.g., a processor, such as an integrated circuit, or analog or digital circuitry) or a combination of software (e.g., programming such as machine- or processor-executable instructions, commands, or code such as firmware, a device driver, programming, object code, etc.) and hardware. Hardware includes a hardware element with no software elements, such as an application specific integrated circuit (ASIC), a Field Programmable Gate Array (FPGA), etc. A combination of hardware and software includes software hosted at hardware (e.g., a software module that is stored at a processor-readable memory, such as random access memory (RAM), a hard-disk or solid-state drive, resistive memory, or optical media such as a digital versatile disc (DVD), or executed or interpreted by a processor), or hardware and software hosted at hardware. The controller may include a processor programmed to perform particular actions. As used herein, a processor is "programmed" to perform an action if the processor includes hardware elements with no software elements to perform the action, the processor includes hardware elements in communication with processor-readable memory containing instructions that cause the hardware elements to perform the action, or the processor includes a combination of hardware elements with and without software elements to perform the action. As used herein, the term "data port" refers to an interface to mechanically and electrically couple with a data conducting cable. The cable may include dedicated wires for carrying user data and separate dedicated wires for carrying power.

The controller 110 may cause the first data port 120 to receive power. For example, a cable may be connected to the first data port 120, and the cable may transfer power from an external device, an alternating current (AC)-to-DC converter, or the like. The controller 110 may cause the second data port 130 to output at least a portion of the received power. For example, a cable may be connected to the second data port 130, and the second data port 130 may transfer power to the cable for delivery to an external device or the like.

The controller 110 may detect an impending loss of power to the first data port 120. For example, the controller 110 may detect that a cable coupled to the first data port 120 is being disconnected. Alternatively, or in addition, the controller 110 may detect that a remote device is being disconnected from the cable. In an example, the controller 110 may receive an indication of the impending loss of power. For example, a remote device may detect an impending loss of power and transmit an indication of the impending loss of power to the controller 110 (e.g., via the first data port 120).

The controller 110 may cause the second data port 130 to transmit an urgent power request. For example, the controller 110 may cause the second data port 130 to transmit the urgent power request to a remote device coupled to the second data port 130. The urgent power request may indicate to the recipient that the system 100 is about to lose power and needs to receive power without performing a power role swap and negotiation. The system 100 may be able to receive power via the second data port 130, for example, in response to the urgent power request.

Figure 2:
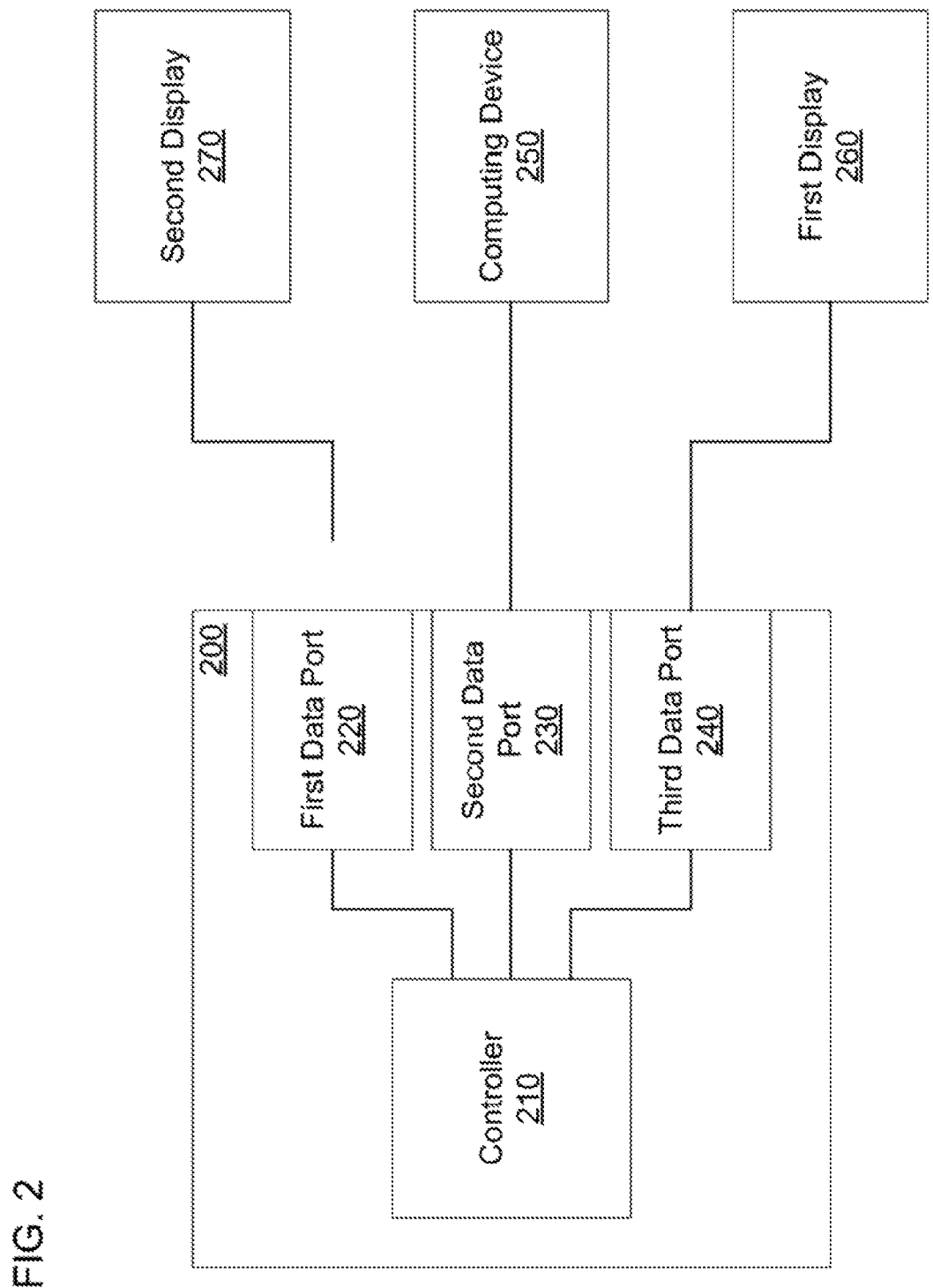
FIG. 2 is a block diagram of another example system to request a rapid reversal of a power transfer.

FIG. 2 is a block diagram of another example system 200 to request a rapid reversal of a power transfer. The system 200 may include a controller 210. The system 200 may also Include first, second, and third data ports 220, 230, 240 coupled to the controller 210. In the illustrated example, the second data port 230 may be connected to a computing device 250 by a cable. The third data port 240 may be connected to a first display 260. The first data port 220 may have been previously connected to a second display 270. For example, a cable connecting the first data port 220 to the second display 270 may be in the process of being removed. In other examples, the system 200 may be coupled to an external hard drive, additional computing devices, peripherals, or the like. In some examples, the system 200 may be part of a data port hub, a computing device, a display device, or the like.

The system 200 may initially have received power from the computing device 250. The controller 210 may have determined, for example, that the second display 270 was receiving power from a fixed supply, such as the power grid (e.g., via an AC-to-DC converter). For example, the controller 210 may have received an indication of the power policies supported by the second display 270 for delivering power, which may have included an indication the second display 270 was receiving power from the fixed supply. Accordingly, the controller 210 may have decided that the system 200, the computing device 250, or the first display 260 should receive power from the second display 270. The controller 210 may have received indications of the power policies supported by the computing device 250 and the first display 260 for receiving power. The indications of supported power policies may have been received from the computing device 250, the first display 260, or the second display 270 in response to requests from the controller 210 for such information.

The controller 210 may have negotiated with the second display 270 to receive power from the second display 270 at a power policy sufficient to power the system 200, the computing device 250, the first display 260, etc. The controller 210 may have negotiated a power swap with the computing device 250. The controller 210 may have negotiated with each of the computing device 250 and the first display 260 to deliver power to the computing device 250 and the first display 260 at power policies sufficient to support full functionality of each. In some examples, the controller 210 may negotiate with the computing device 250 to deliver power at a power policy sufficient to charge a battery.

The controller 210 may detect the impending loss of power to the first data port 220. For example, a cable connected to the first data port 220 may be in the process of being disconnected. The signal pins of the cable may be shorter than the power pins. The controller 210 may detect that the signal pins have been disconnected while the power pins are still connected. Alternatively, or in addition, the system 200 may store some power, for example, capacitively, and the controller 210 may detect that the cable has been disconnected while some stored power remains. In an example, the controller 210 may detect the impending loss of power by receiving from the second display 270 an indication that the second display 270 detected an impending loss of power, an indication that the second display 270 is stopping delivery of power (e.g., a hard reset, a soft reset, a request for a power role swap, etc.), or the like.

The controller 210 may transmit an urgent power request to the computing device 250 based on detecting the impending loss of power. The urgent power request may be readable at a physical layer to allow for quicker processing. For example, the urgent power request may include or consist of a preamble and a message identifier indicating the message is an urgent power request. In a USB example, the message identifier may be an ordered set including the USB symbols RST-2, RST-2, Sync-3, Sync-3 or the like. Alternatively, or in addition, the urgent power request may be indicated by an identifier in the payload of a message and processed by a higher layer. The controller 210 may transmit the urgent power request using a power pin, a ground pin, a configuration pin, a data pin, a high speed transmit pin, or the like.

The controller 210 may cause the second data port 230 to decrease the power being delivered to the computing device 250 after transmitting the urgent power request. If the urgent power request is readable at the physical layer, the controller 210 may cause the second data port 230 to decrease the power being delivered without waiting for response. The controller 210 may cause the second data port 230 to decrease the power immediately after transmission or may wait a predetermined time after transmission before causing the second data port 230 to decrease the power. If the urgent power request is indicated by an identifier in a message payload, the controller 210 may cause the second data port 230 to decrease the power after an acknowledgement of a cyclic redundancy check (CRC) is received, after an acceptance is received, a predetermined time after transmission, or the like.

In the illustrated example, the computing device 250 may receive and evaluate the urgent power request. The computing device 250 may deliver power to the second data port 230 within a predetermined time of receiving the urgent power request. In an example, the computing device 250 may deliver power to the second data port 230 at a previously negotiated power policy. For example, the computing device 250 may have been transferring power to the system 200 at a negotiated power policy before a power role swap was performed and the second display 270 provided power. The computing device 250 may deliver power at that negotiated power policy rather than reverting to a default power policy where minimal power is transferred.

Alternatively, or in addition, the controller 210 and the computing device 250 may negotiate a fallback power policy, and the computing device 250 may deliver power at the negotiated power policy in response to receiving the urgent power request. For example, the computing device 250 may indicate the power policies at which it is capable of providing power. The controller 210 may determine how much power it requires and may request a fallback power policy based on the amount of power required. The computing device 250 may accept or reject the requested fallback power policy. If the computing device 250 accepts the requested fallback power policy, the computing device 250 may deliver power at the fallback power policy when it receives an urgent power request.

The controller 210 may determine which fallback power policy to request based on a local power requirement or a power requirement of another device connected to the system 200. In the illustrated example, the controller 210 may determine its local power requirement and a power requirement of the first display 260, and the controller 210 may select a fallback power policy based on the power requirements (e.g., based on a sum, a maximum, etc. of the voltages, operating currents, maximum currents, etc. required). If the devices connected to the system 200 change, the controller 210 may negotiate a new fallback power policy. For example. If first display 260 was initially unconnected from the third display port 240, the controller 210 may have negotiated a fallback power policy sufficient to support itself only. The controller 210 may have detected the connection of the first display 260 to the third data port 240 and may have negotiated a new fallback power policy sufficient to power the controller 210 and the first display 260. In some examples, the device from which power is to be received (e.g., the computing device 250) may not be included in the power requirements, and the current power source (e.g., the second display 270) may or may not be included in the power requirements.

In the illustrated embodiment, the computing device 250 may have been displaying an image on the first display 260 when the second display 270 was disconnected from the system 200. The system 200 may have been transferring data from the computing device 250 to the first display 260 while it was transferring power from the second display 270 to the computing device 250 and the first display 260. When an impending loss of power was detected, the controller 210 may have caused the second data port 230 to transmit the urgent power request to the computing device 250. When power was received from the computing device 250, the controller 210 may have caused the third data port 240 to deliver at least a portion of the power to the first display 260 so that the first display 260 could continue operation.

Because the controller 210 transmitted an urgent power request to respond to the impending loss of power, there may have been no or minimal interruption to operation of the first display 250. In contrast, there would have been a prolonged interruption to the operation of the first display 250 if a power swap and negotiation of a higher power policy or a detection of the power loss and negotiation of a higher power policy were performed by the controller 210 and the computing device 250.

Figure 3:
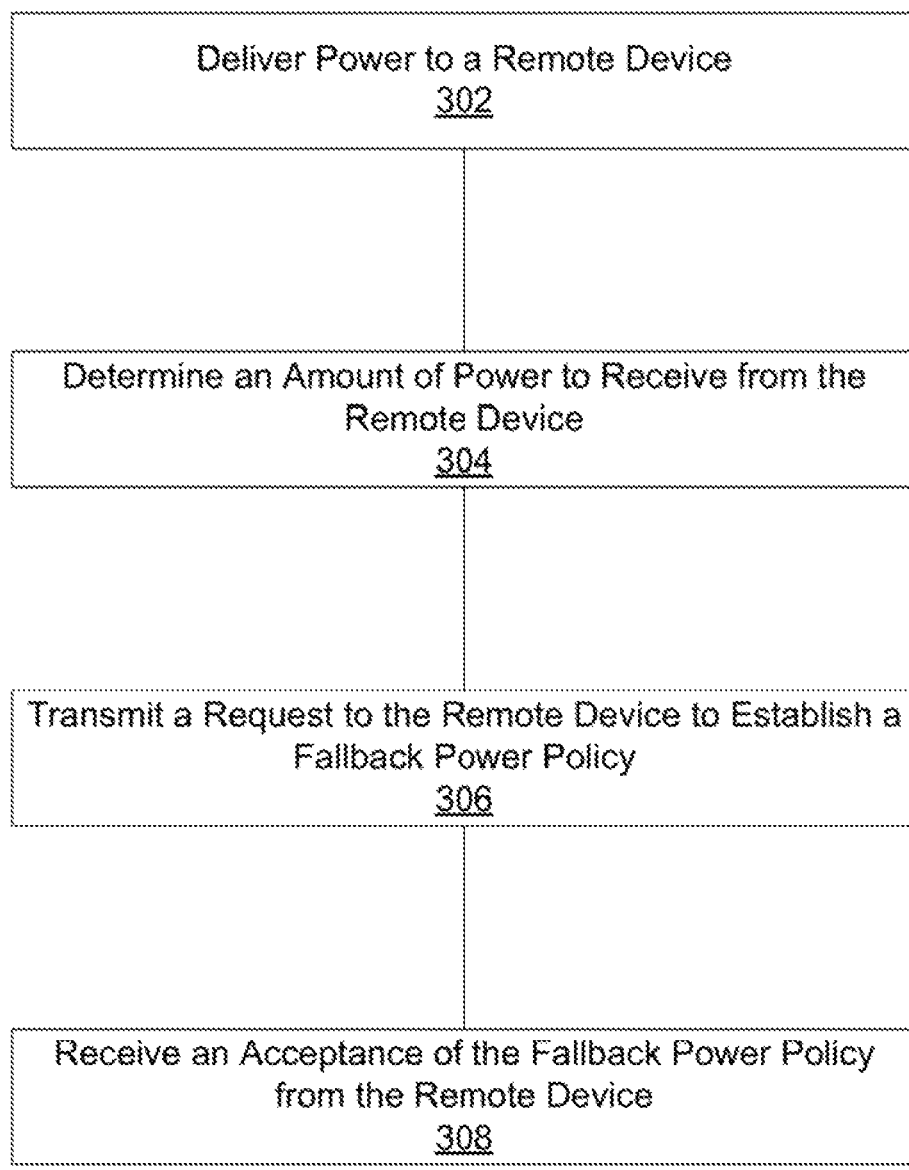
FIG. 3 is a flow diagram of an example method to request a rapid reversal of a power transfer.

FIG. 3 is a flow diagram of an example method 300 to request a rapid reversal of a power transfer. At block 302, the method 300 may include delivering power to a remote device. For example, DC power may be delivered to a data port of the remote device via a cable. At block 304, the method 300 may include determining an amount of power to receive from the remote device. The amount of power to receive from the remote device may be the amount of power required if a current power source stopped providing power.

Block 306 may include transmitting a request to the remote device to establish a fallback power policy based on the amount of power determined at block 304. In an example, the remote device may have provided an indication of power policies it is capable of providing. The fallback power policy may be selected based on the power policies the remote device can provide and the required amount of power. The transmission may indicate the selected fallback power policy. Block 308 may include receiving an acceptance of the fallback power policy from the remote device. The acceptance may indicate that the remote device is willing and able to provide power at the fallback power policy in the event that the current power source stops providing power. Referring to FIG. 1, the controller 110 or the second data port 130, for example, may perform blocks 302, 304, 306, or 308.

Figure 4:
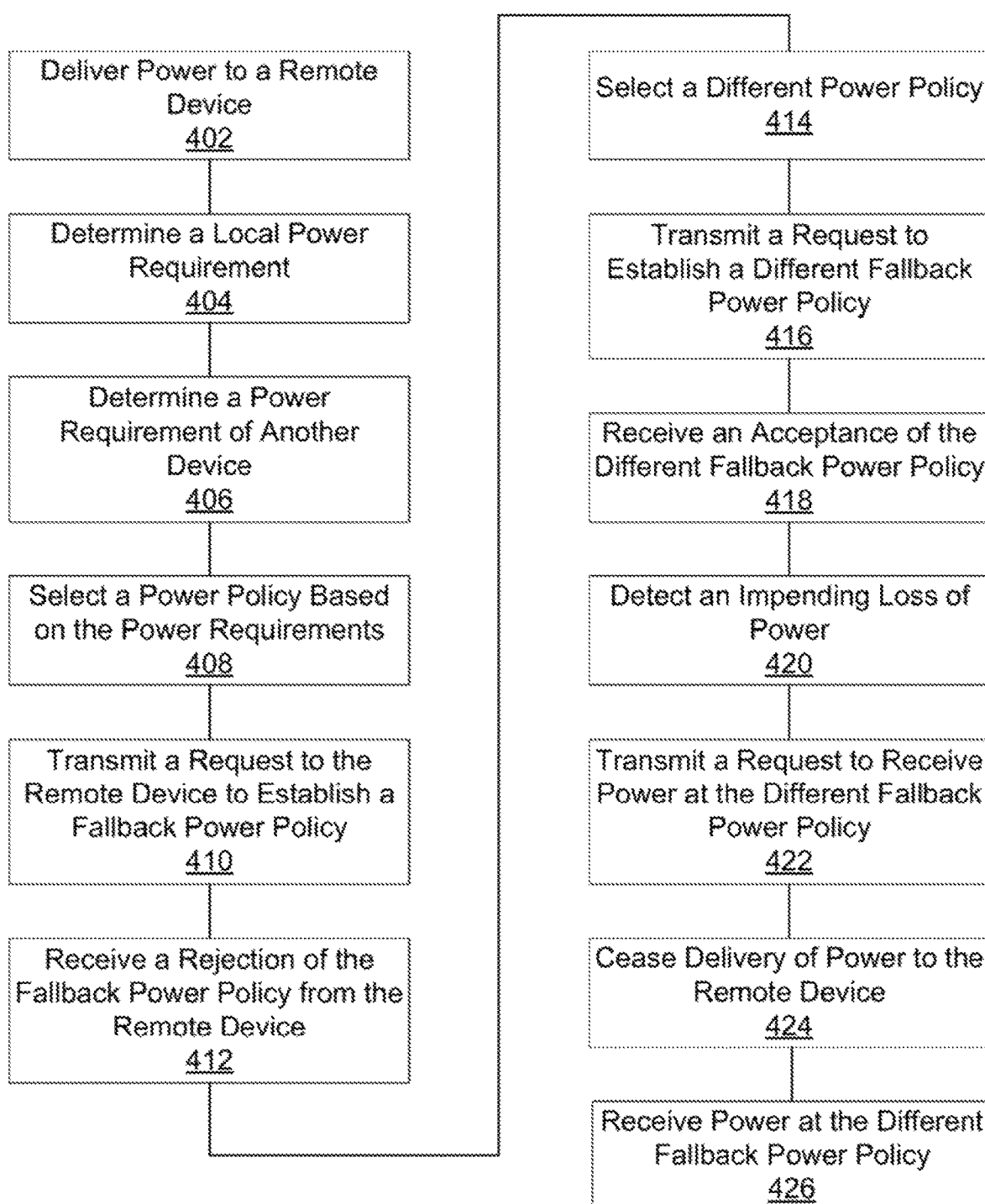
FIG. 4 is a flow diagram of another example method to request a rapid reversal of a power transfer.

FIG. 4 is a flow diagram of another example method 400 to request a rapid reversal of a power transfer. At block 402, the method 400 may include delivering power to a remote device. The power may be delivered to a remote device that is also able to deliver power. Block 404 may include determining a local power requirement. Block 406 may include determining a power requirement of another device (e.g., a device to which power is currently being transferred). For example, the local power requirement and the power requirement of the other device may be determined based on how much power will be needed locally and at the other device in the event of a loss of power from a current power source. Determining the power requirement may include determining a voltage required, determining an operating current, determining a maximum current, determining an operating power, determining a maximum power, determining a power source required, or the like. The amount of power required by the other device may be determined based on a currently negotiated power policy, based on a previous indication of its power requirements, by requesting an indication of its power requirements, or the like.

At block 408, the method 400 may include selecting a power policy based on the local power requirement and the power requirement of the other device. The power policy may be selected based on a maximum, a sum, or the like of the voltages, operating currents, maximum currents, operating powers, maximum powers, or the like of the power requirements. For example, the power policy may be selected based on a maximum of the voltages and based on a current sufficient to provide the operating current of each power requirement at the voltage of that power requirement. Alternatively, or in addition, the power policy may be selected based on a current sufficient to provide a power reserve able to satisfy a maximum current of at least one power requirement. In some examples, the remote device may have indicated power policies at which it is capable of providing power. The power policy may be selected based on the indicated power policies.

Block 410 includes transmitting a request to the remote device to establish a fallback power policy. The power policy selected based on the power requirements at block 408 may be requested to be the fallback power policy. The request may indicate that it is contingent on a loss of power from a current source. For example, an indication of the message type for a fallback request may be distinct from the indication of the message type for a request for immediate power. The request may also include a data object indicating the selected power policy. At block 412, the method 400 may include receiving a rejection of the fallback power policy. For example, the remote device may have previously indicated that it could provide power at a particular power policy but now may not be able to do so. The rejection may indicate that the remote device will not provide power at the requested power policy if an urgent power request is received. In some examples, after a rejection of a fallback request, the remote device may provide power at a previously negotiated fallback power policy if it receives an urgent power request. Alternatively, after a rejection of a fallback request, the remote device may not provide power or may only provide power at a default power policy if it receives an urgent power request.

At block 414, the method 400 may include selecting a different power policy. The different power policy may be selected by determining a device currently receiving power should stop receiving power if power from a current power source is lost. For example, a device may have indicated that it can give back power if needed, so the different power policy may be selected based on the minimum power needed by the device that can give back power. Alternatively, or in addition, it may be decided that a device should stop receiving power if power from a current power source is lost. In an example, an acceptance may have been received at block 412, and the different power policy may be selected based on another device being connected. Block 416 may include transmitting a request to establish a different fallback power policy. The request may indicate that the different power policy selected at block 414 should be the fallback power policy. Block 418 may include receiving an acceptance of the different fallback power policy. The remote device may transmit an acceptance indicating it will provide power at the different fallback power policy if it receives an urgent power request. In some examples, the method 400 may include receiving a rejection of the different fallback power policy from the remote device.

At block 420, the method 420 may include detecting an impending loss of power. For example, detecting the impending loss of power may include detecting the disconnection of signal pins on a plug, receiving an indication from a power source of an impending loss of power, detecting a loss of power while capacitively stored power remains, or the like. Block 422 may include transmitting a request to receive power at the different fallback power policy. The request may be readable by a physical layer, may be readable by a higher layer, or the like. For example, the request may include or consist of a preamble and an identifier. The identifier may be interpreted by the remote device as indicating that power at the agreed upon power policy should be provided immediately. Alternatively, or in addition, an indication in the payload may represent that power at the agreed upon power policy should be provided immediately.

Block 424 may include ceasing delivery of power to the remote device. The delivery of power may be ceased after transmitting the request to receive power without delaying, a predetermined time after transmitting the request, after receiving a confirmation the message and CRC were received without error, after receiving a message accepting the request, or the like. The voltage applied to a cable connected to the remote device may be decreased to approximately zero. The remote device may increase the voltage on the cable according to the fallback power policy and prepare itself to be able to deliver current according to the fallback power policy. At block 426, the method 400 may include receiving power at the different fallback power policy. Power may be received once the voltage has been increased to the level specified by the fallback power policy, or the power may be drawn as the voltage on the cable is increased to the specified level. The received power may be used to continue or start delivery of power to devices that had their power requirements included in the determination of the fallback power policy. In an example, the controller 210 and the second data port 230 of FIG. 2 may perform blocks 402-426.

Figure 5:
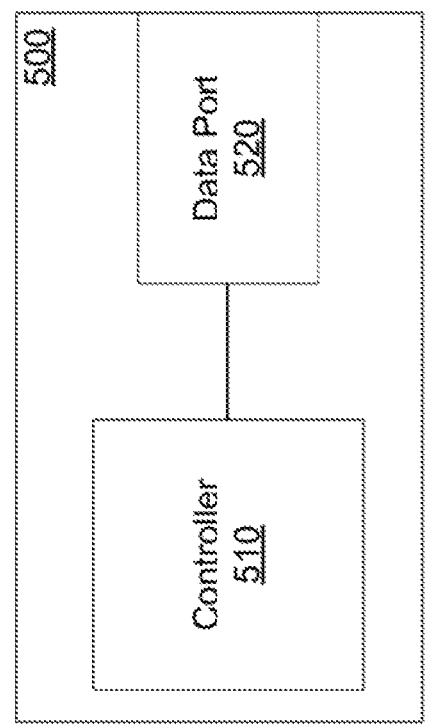
FIG. 5 is a block diagram of an example device to deliver power in response to a request for a rapid reversal of a power transfer.

FIG. 5 is a block diagram of an example device 500 to deliver power in response to a request for a rapid reversal of a power transfer. The device 500 may include a data port 520 and a controller 510 electrically coupled to the data port 520. The controller 510 may cause the data port 520 to receive power, for example, from a remote device. The controller 510 may have negotiated an amount of power to receive and may cause the device 500 to operate using the power received by the data port 520.

The controller 510 may determine a power policy for delivering power to the remote device. For example, the controller 510 may determine how much power the remote device would require if it were no longer able to provide power to the device 500. The determined power policy may not be used immediately for providing power to the remote device. Rather, an indication of the power policy may be stored, for example, in a volatile or persistent computer readable medium.

The controller 510 may receive an urgent power request from a remote device coupled to the data port 520. For example, the remote device may transmit the urgent power request to the data port 520 over a cable. The controller 510 may receive the urgent power request from the data port 520 and identify it as an urgent power request. The controller 520 may include a physical layer for communicating over the cable, and the physical layer may identify the received message as an urgent power request.

The controller 510 may cause the data port 520 to deliver power at the previously determined power policy to the remote device based on the urgent power request without additional negotiation with the remote device. For example, the controller 510 may cause the data port 520 to deliver power at the power policy without receiving an indication of the power policy in the urgent power request or any additional communications after the urgent power request and before power is delivered. In an example, the controller 510 may cause the data port 520 to deliver power at the power policy without transmitting an acceptance of the urgent power request, without transmitting an acknowledgement a message or CRC was received correctly, or the like. The power may be delivered to the remote device over a cable coupled to the data port 520.

Figure 6:
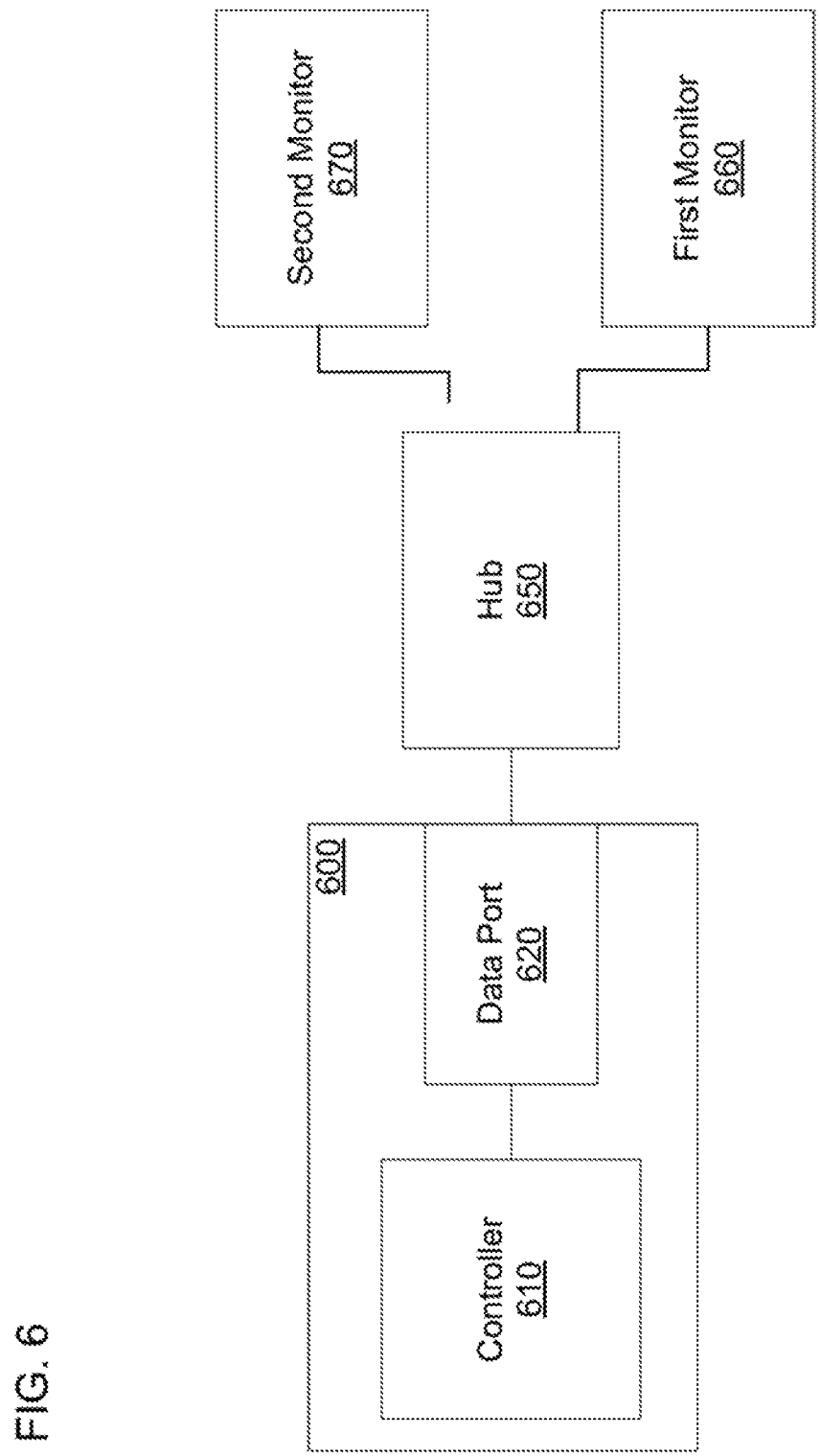
FIG. 6 is a block diagram of another example device to deliver power in response to a request for a rapid reversal of a power transfer.

FIG. 6 is a block diagram of another example device 600 to deliver power in response to a request for a rapid reversal of a power transfer. The device 600 may include a controller 610 electrically coupled to a data port 620. The data port 620 may be connected to a hub 650, which may be connected to a first monitor 660 and a second monitor 670. The data port 620 and the hub 650 may be connected by a cable able to transfer power and data between the data port 620 and the hub 650. The controller 610 may initially cause the data port 620 to deliver power to the hub 650. The hub 650 may detect that the second monitor 670 is able to provide power from a fixed supply, so the hub 650 may negotiate to receive power from the second monitor 670. The controller 610 and the hub 650 may perform a power role swap and negotiate a power policy sufficient to power the device 600.

The controller 610 may determine a power policy for delivering power to the hub 650. In an example, the controller 610 may determine the power policy based on an amount of power previously delivered to the hub 650 (e.g., a power policy at which power was previously delivered to the hub 650). The controller 610 may determine the power policy by storing an indication of a power policy used to deliver power to the hub 650. For example, the controller 610 may store the indication of the power policy when a power role swap is performed with the hub 650 to receive power from the hub 650. The stored indication may be retrieved and used to determine the power policy at which to deliver power in response to an urgent power request.

The controller 610 and the hub 650 may determine the power policy for delivering power to the hub 650 by negotiating the power policy. In an example, the previous power policy may be a default fallback power policy that can be overridden by explicit negotiation. Alternatively, an explicit negotiation may be required to set the fallback power policy. The hub 650 may determine its power requirements and transmit an indication of a power policy selected based on the hub's power requirements to the controller 610. For example, the hub 650 may determine that power will be needed for the hub 650 and the first monitor 660 if power is lost from the second monitor 670. Alternatively, or in addition, the hub 650 may determine that power will be needed for the hub 650, the first monitor 660, and the second monitor 670. The hub 650 may select a power policy based on the power needed and transmit an indication of the power policy to the controller 610. The controller 610 may accept the power policy and store the transmitted indication or a differently formatted indication of the power policy. The stored indication may be retrieved and used to determine the power policy at which to deliver power when an urgent power request is received.

The controller 610 may receive an urgent power request from the hub 650. For example, the hub 650 may transmit the urgent power request to the data port 620 over the cable, and the controller 610 may receive the urgent power request from the data port 620 and decode it. The controller 610 may include a physical layer, and the physical layer may identify a received message as an urgent power request. For example, the urgent power request may include or consist of a preamble and a message identifier. The physical layer may decode the message identifier to identify the message as an urgent power request without additional decoding by higher layers. The physical layer may be able to identify the message faster than if a higher layer had identified the message. Alternatively, or in addition, the message may include an identification as an urgent power request that is decodable by higher layers.

In some examples, the controller 610 may cause the device 600 to stop sinking current from the data port 620. For example, the controller 610 may cause elements sinking current to be disconnected from the data port 620 based on receiving the urgent power request. The controller 610 may cause the elements sinking current to be connected to an alternate power source, such as a battery, or to not receive power. The controller 610 may cause the data port 620 to deliver power to the hub 650 at the previously determined power policy based on the urgent power request. Because the power policy has already been determined, the controller 610 may be able to cause the data port 620 to deliver power without additional negotiation with the hub 650. The controller 610 may increase the power output by the data port 620 until it corresponds to the power policy, and the hub 650 may draw power at the power policy. In some examples, the controller 610 may not need to transmit any additional communications before the hub 650 draws power. For example, the hub 850 may draw power as the power output by the data port 620 is increased. Alternatively, the controller 610 may cause the data port 620 to transmit a ready signal once it is able to output power at the power policy.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
   a first data port;
   a second data port; and
   a processor electrically coupled to the first and second data ports, the processor programmed to:
      cause the first data port to receive power;
      cause the second data port to output at least a portion of the received power;
      detect an impending loss of power to the first data port, and
      cause the second data port to transmit an urgent power request in response to detection of the impending loss of power to the first data port.

2. The system of claim 1, wherein the processor is programmed to detect the impending loss of power to the first data port by detecting disconnection of a signal pin from the first data port.

3. The system of claim 1, wherein the processor is programmed to:
   negotiate a fallback power policy with a device coupled to the second data port prior to detecting the impending loss of power; and
   receive power from the device coupled to the second data port in response to the urgent power request.

4. The system of claim 3, further comprising a third data port, wherein the processor is programmed to detect a new connection to the third data port, and negotiate a new fallback power policy in response to the new connection.

5. The system of claim 1, wherein the processor is programmed to cause the second data port to decrease the power output after transmitting the urgent power request.

6. The system of claim 1, wherein the processor is programmed to detect the impending loss of power by detecting that signal pins have been disconnected while power pins are still connected.

7. The system of claim 1, wherein the processor is programmed to decrease the power being output without waiting for a response to the urgent power request.

8. A method, comprising:
delivering power to a remote device;
determining an amount of power to receive from the remote device;
transmitting a request to the remote device to establish a fallback power policy based on the amount of power;
receiving an acceptance of the fallback power policy from the remote device;
detecting an impending loss of power; and
transmitting a request to receive power at the fallback power policy to the remote device in response to detecting the impending loss of power.

9. The method of claim 8, further comprising:
decreasing delivery of power without waiting for a response to the request; and
receiving power at the fallback power policy.

10. The method of claim 9, further comprising ceasing delivery of power to the remote device after transmitting the request to receive power.

11. The method of claim 8, further comprising:
determining a different amount of power to receive;
transmitting a request to establish a different fallback power policy to the remote device; and
receiving a rejection of the different fallback power policy from the remote device.

12. The method of claim 8, wherein determining the amount of power to receive comprises:
determining a local power requirement;
determining a power requirement of another device; and
selecting a power policy based on the local power requirement and the power requirement of the other device.

13. A device, comprising:
a data port; and
a processor coupled to the data port, the processor programmed to:
cause the data port to receive power from a remote device,
determine a power policy for delivering power to the remote device,
receive an urgent power request from the remote device coupled to the data port, and
cause the data port to deliver power at the power policy to the remote device based on the urgent power request without additional negotiation with the remote device.

14. The device of claim 13, wherein the processor is programmed to:
cause the data port to deliver power prior to receiving power, and
determine the power policy for delivering power based on a power policy at which power was previously delivered.

15. The device of claim 13, wherein the processor is programmed to determine the power policy for delivering power by negotiating the power policy with the remote device prior to receiving the urgent power request.

16. The device of claim 13, wherein the processor is programmed to cause the device to stop sinking current from the data port prior to causing the data port to deliver power.

17. The device of claim 13, wherein the processor includes a physical layer, and wherein the physical layer is to determine the urgent power request was received.

18. The device of claim 13, wherein the processor is programmed to cause elements sinking current to be disconnected from the data port based on receiving the urgent power request.

19. The device of claim 13, wherein the processor is programmed to cause the data port to transmit a ready signal once it is able to output power at the power policy.

20. A method, comprising:
delivering power to a remote device;
determining an amount of power to receive from the remote device;
transmitting a request to the remote device to establish a fallback power policy based on the amount of power;
receiving an acceptance of the fallback power policy from the remote device;
determining a different amount of power to receive;
transmitting a request to establish a different fallback power policy to the remote device; and
receiving a rejection of the different fallback power policy from the remote device.

* * * * *